US005765962A

United States Patent [19]

Cornell et al.

[11] Patent Number: 5,765,962

[45] Date of Patent: Jun. 16, 1998

[54] GROUND ROD CONNECTOR

[75] Inventors: Paul A. Cornell, Lismore; Roy K. Warner, Strawhall, both of Ireland

[73] Assignee: Pan Electric Corporation, Carson City, Nev.

[21] Appl. No.: 602,180

[22] Filed: Feb. 15, 1996

[51] Int. Cl.[6] .................... H01R 4/40; F16B 2/10

[52] U.S. Cl. .................... 403/396; 403/399; 439/100; 439/789

[58] Field of Search .................... 403/274, 282, 403/389, 396, 398, 399; 439/92, 100, 789

[56] References Cited

U.S. PATENT DOCUMENTS

| | | | |
|---|---|---|---|
| D. 296,777 | 7/1988 | Cornell . | |
| 318,182 | 5/1885 | Guhl . | |
| 879,940 | 2/1908 | Blood, Jr. . | |
| 1,679,677 | 8/1928 | Milne | 439/100 |
| 2,370,748 | 3/1945 | O'Donnell | 403/389 X |
| 2,700,807 | 2/1955 | Petersen . | |
| 2,915,275 | 12/1959 | Korka | 403/389 X |
| 3,019,409 | 1/1962 | Sarafinas | 439/92 |
| 3,169,818 | 2/1965 | Tracy . | |
| 3,351,889 | 11/1967 | Lawlor et al. | 439/789 X |
| 3,437,979 | 4/1969 | Beaudion . | |
| 3,537,150 | 11/1970 | Emberson . | |
| 3,801,952 | 4/1974 | Lawlor . | |
| 3,831,134 | 8/1974 | Cornell et al. . | |
| 3,861,771 | 1/1975 | Cornell . | |
| 3,879,104 | 4/1975 | Shugarman et al. . | |
| 3,883,211 | 5/1975 | Shugarman et al. . | |
| 3,892,455 | 7/1975 | Sotolongo | 439/100 |
| 3,973,821 | 8/1976 | Scott et al. . | |
| 3,980,381 | 9/1976 | Cornell . | |
| 3,985,411 | 10/1976 | Mooney et al. | 439/100 X |
| 3,990,129 | 11/1976 | Cornell et al. | 439/789 X |
| 4,001,921 | 1/1977 | Lawlor et al. . | |
| 4,014,078 | 3/1977 | Cornell et al. . | |
| 4,097,169 | 6/1978 | Kelly | 403/396 X |
| 4,126,918 | 11/1978 | Cornell . | |
| 4,128,294 | 12/1978 | McCord . | |
| 4,186,981 | 2/1980 | Holton | 439/92 |
| 4,357,068 | 11/1982 | Cornell et al. . | |
| 4,475,843 | 10/1984 | Wyler | 403/399 X |
| 4,479,694 | 10/1984 | Cornell et al. . | |
| 4,526,428 | 7/1985 | Sachs | 439/92 |
| 4,548,462 | 10/1985 | Cornell . | |
| 4,898,551 | 2/1990 | Cornell . | |

FOREIGN PATENT DOCUMENTS

| | | | |
|---|---|---|---|
| 77339 | 7/1919 | Austria . | |
| 147455 | 8/1921 | United Kingdom . | |
| 529520 | 11/1940 | United Kingdom . | |
| 1188953 | 4/1970 | United Kingdom | 439/789 |

OTHER PUBLICATIONS

AMP, Inc., AMPACT, AMP Wrench-Lok, AMP Miniwedge Connectors, 1995.

ERITECH, Inc., "Ground Rod Accessories", pp. A1-9-A1-10, A2-1-A2-21 (1994).

*Primary Examiner*—Kenneth J. Dorner

*Assistant Examiner*—Andrea Chop

*Attorney, Agent, or Firm*—Brinks Hofer Gilson & Lione

[57] ABSTRACT

A ground rod connector includes first and second connector portions that are pivotably mounted together to move between an open position and a closed position. The connector portions include tail portions that are positioned adjacent one another in side-by-side orientation when the connector portions are in the closed position, and a threaded fastener is coupled between the tail portions to hold the connector portions in the closed position. The connector portions cooperate to form a ground rod receiving passage and at least one ground wire receiving passage. These passages are formed in part by the first connector portion and in part by the second connector portion and are oriented such that movement of the connector portions to the closed position clamps a ground rod and a ground wire in the respective passages.

14 Claims, 3 Drawing Sheets

GROUND ROD CONNECTOR

BACKGROUND OF THE INVENTION

This invention relates to a ground rod connector of the type comprising first and second connector portions for interconnecting a ground rod and a ground wire.

Ground rod connectors are used to connect a ground wire to a ground rod. The ground rod is typically a rigid metal bar or tube that is electrically grounded, as for example by being in electrical contact with the earth. One type of prior art ground rod connector uses a set screw in a frame to establish electrical contact with the ground rod. Such connectors may have difficulties adapting to thermal expansion and contraction of the ground rod. In some cases, such thermal expansion can cause a loosening of a set screw type ground rod connector. Of course, if the connector loosens an inadequate grounding connection is often the result.

The present invention is directed to an improved ground rod connector that accommodates thermal expansion and contraction, and that provides a reliable grounding connection.

SUMMARY OF THE INVENTION

According to this invention, a ground rod connector is provided comprising first and second connector portions pivotably mounted together to move between an open position and a closed position. Each of the connector portions comprises a ground rod clamping portion and a tail portion. The tail portions are positioned adjacent to one another in side-by-side orientation when the connector portions are in the closed position. A fastener is coupled between the tail portions to hold the connector portions in the closed position. The connector portions cooperate to form a ground rod receiving passage and at least one ground wire receiving passage. These passages are formed in part by the first connector portion and in part by the second connector portion and are oriented such that movement of the connector portions to the closed position clamps a ground rod in the ground rod receiving passage and a ground wire in the ground wire receiving passage

DETAILED DESCRIPTION OF THE PRESENTLY PREFERRED EMBODIMENTS

Figure 1:
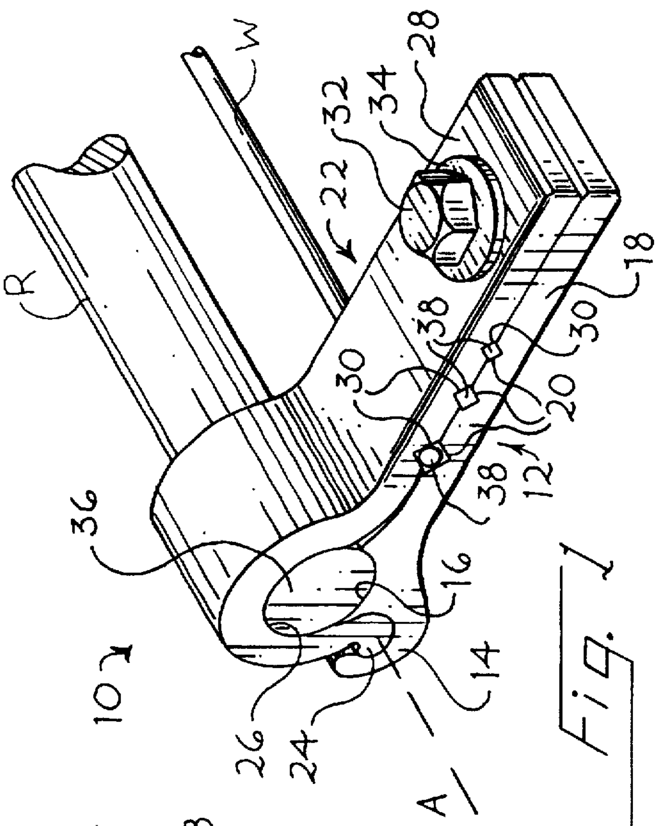
FIG. 1 is a perspective view of a first preferred embodiment of the ground rod connector of this invention.

Turning now to the drawings, FIGS. 1 through 4 show various views of connector 10 which incorporates a first preferred embodiment of this invention The connector 10 is adapted for use with a ground rod R and one or more ground wires W. The connector 10 includes a first portion 12 which defines a pivot bearing 14 and a ground rod clamping portion 16 immediately adjacent to the pivot bearing 14. The first portion 12 also defines a tail portion 18 which generally extends in a plane parallel to a pivot axis A defined by the pivot bearing 14. The tail portion 18 defines one or more ground wire clamping portions 20, each formed as a groove on a surface of the tail portion 18.

The connector 10 also includes a second portion 22 which defines a pivot shaft 24 pivotably received in the pivot bearing 14 such that the entire second portion 22 is pivotable about the axis A between an open position (not shown) and a closed position, as shown in FIGS. 1–4. The second portion 22 includes a ground rod clamping portion 26 adjacent to the pivot shaft 24 and a tail portion 28. The tail portion 28 defines a matching array of ground wire clamping portions 30, each formed as a respective groove in the appropriate surface of the tail portion 28.

Figure 2:
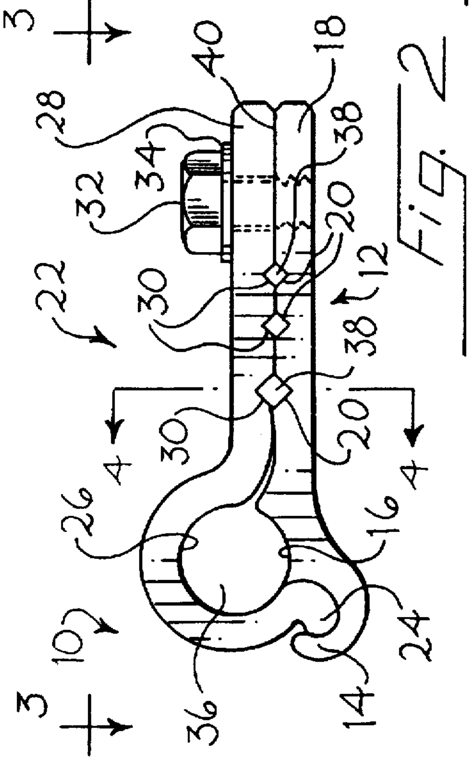
FIG. 2 is a side view of the embodiment of FIG. 1.
Figure 3:
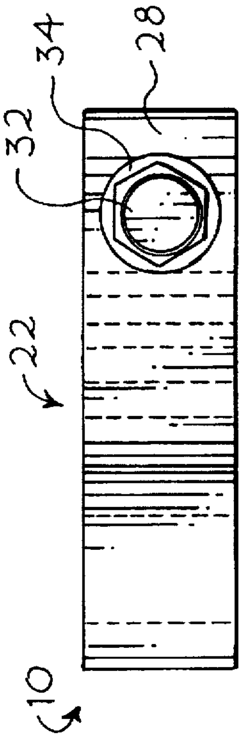
FIG. 3 is a top view taken along line 3—3 of FIG. 2.

The first and second portions 12, 22 are held in the closed position by a fastener, such as a bolt 32 and a washer 34. The bolt 32 extends through an unthreaded opening in the tail portion 28, and threadedly engages a threaded opening in the tail portion 18, as best shown in FIG. 2.

The ground rod clamping portions 16, 26 cooperate to form a ground rod receiving passage 36, in which diametrically opposed portions of the passage 36 are formed by the clamping portions 16, 26. The ground rod clamping portions 16, 26 are configured such that when the connector 10 is moved to the closed position shown in FIG. 1, the ground rod R is securely held in the ground rod receiving passage 36 by the diametrically opposed clamping portions 16, 26.

The ground wire clamping portions 20, 30 cooperate to form at least one ground wire receiving passage 38, which is sized to clamp the respective ground wire W securely in place when the bolt 32 holds the first and second portions 12, 22 in the closed position of FIG. 1. The ground wire clamping portions 20, 30 form diametrically opposed portions of the ground wire receiving passage 38.

Figure 4:
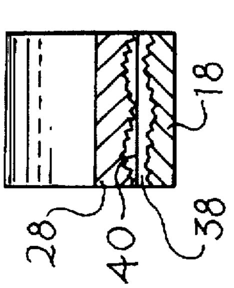
FIG. 4 is a cross-sectional view taken along line 4—4 of FIG. 2.
Figure 5:
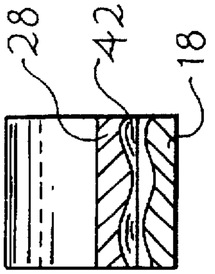
FIG. 5 is a cross-sectional view corresponding to that of FIG. 4 showing a modification of the first embodiment.

As best shown in FIG. 4, the ground wire receiving passage 38 is preferably undulating and serrated to insure excellent electrical contact between the connector 10 and the ground wire W. FIG. 4 shows the manner in which the ground wire receiving passage 38 is disposed on both sides of a plane of contact 40 between the tail portions 18, 28. If desired, the ground wire receiving passage 38 can be unserrated as shown at 42 in FIG. 5, and it does not have to be undulating in all cases.

In use, the bolt 32 is initially removed from the first and second portions 12, 22. Then the first and second portions 12, 22 are pivoted about the axis A to the open position (not shown), and are moved into alignment with the ground rod R. At this point, the bolt 32 is installed in the first and second portions 12, 22 and tightened partially. The ground wire W is then positioned in the ground wire receiving passage 38, and the bolt 32 is tightened until both the ground rod R and the ground wire W are securely held in place in the connector 10.

The first and second portions 12, 22 can be formed of a conductive metal alloy, and this metal alloy provides a rigidity and a resilience that insure long-term electrical contact with the ground rod R and the wire W, in spite of dimensional changes associated with thermal cycling. The connector 10 can be installed on the ground rod R from the side of the ground rod R, and therefore it is not necessary to have access to an undistorted end of the ground rod R in order to use the connector 10. The ground wire receiving passages 38 can be formed in various sizes to accept ground wires W in a wide range of sizes, or to accept multiple ground wires W.

Figures 6, 7, 8, 9:
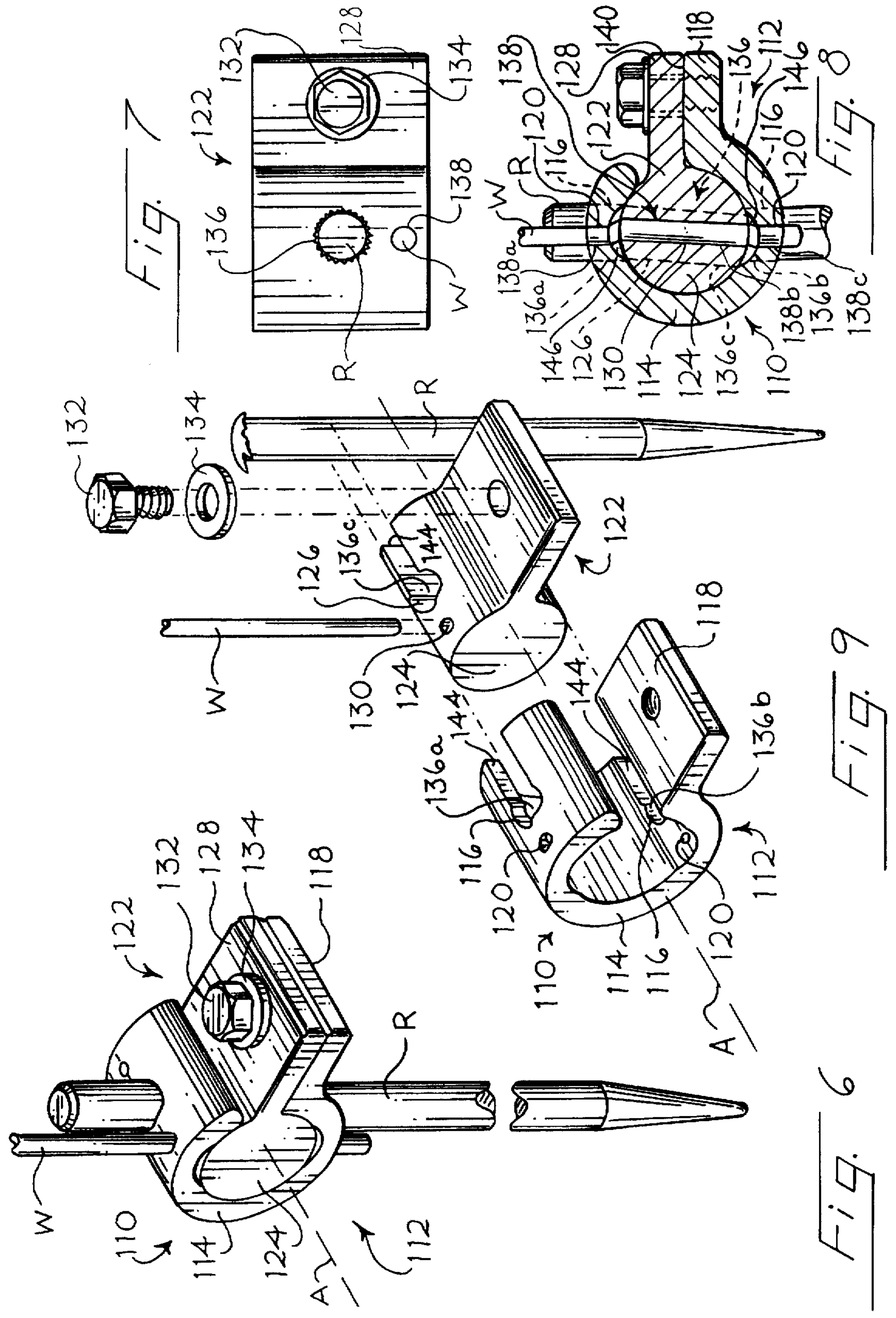
FIG. 6 is a perspective view of a second preferred embodiment of this invention.
FIG. 7 is a top view of the connector of FIG. 6.
FIG. 8 is a cross-sectional view of the connector of FIG. 7.
FIG. 9 is an exploded perspective view of a modification of the second embodiment of FIG. 6.

FIGS. 6 through 8 relate to a connector 110 which incorporates a second preferred embodiment of this invention. The connector 110 includes a first portion 112 which defines pivot bearing 114. The pivot bearing 114 defines a ground rod clamping portion 116, which in this embodiment comprises two diametrically opposed portions of the pivot bearing 114.

The first portion 112 also includes a tail portion 118, which is threaded to receive a bolt as described below. The pivot bearing 114 also forms a ground wire clamping portion 120, which is again formed of two diametrically opposed portions of the pivot bearing 114.

The connector 110 also includes a second portion 122 which includes a pivot shaft 124 and a tail portion 128. The pivot shaft 124 defines a ground rod clamping portion 126 and a ground wire clamping portion 130. The clamping portions 126, 130 are formed as passages extending diametrically through the pivot shaft 124 and intersecting the pivot axis A.

The first and second portions 112, 122 are pivotable about the axis A between an open position (not shown) and a closed position, as shown in FIGS. 6 and 8. The portions 112, 122 are held in the closed position by a fastener such as a bolt 132 and a washer 134. The bolt 132 extends through an unthreaded opening in the tail portion 128 and is threadably received in a threaded opening in the tail portion 118, as shown in FIG. 8.

The ground rod clamping portions 116, 126 cooperate to form a ground rod receiving passage 136 which extends through the pivot bearing 114 and the pivot shaft 124 substantially perpendicularly to the axis A. In FIG. 8 the symbols **136*a* and 136*b* are used for first and second portions of the ground rod receiving passage 136, and the symbol 136*c* is used for the central portion of the ground rod receiving passage, formed by the pivot shaft 124**.

As shown in FIG. 7, one or more portions of the ground rod receiving passage 136 can be serrated to improve electrical contact between the ground rod R and the first and second portions 112, 122 Similarly, one or more ground wire receiving passages 138 are formed by the ground wire clamping portions 120, 130. As before, the ground wire clamping portion 120 defines outer portions **138*a*, 138*b* of the ground wire receiving passage 138, and the ground wire clamping portion 130 forms the central portion 138*c* of the ground wire receiving passage 138**.

When the connector 110 is opened, the second portion 122 is pivoted counterclockwise from the position shown in FIG. 8 until the central portion **136*c* is aligned with the outer portions 136*a* and 136*b* of the ground wire rod receiving passage 136. In this orientation of the second portion 122 the three portions 138*a*, *b*, *c* of the ground wire receiving passage 138 are also aligned. This allows the ground rod R and the ground wire W to be inserted in the connector 110. Then the bolt 132 is used to rotate the second portion 122 with respect to the first portion 112 to misalign the central portions 136*b*, 138*b* with respect to the outer portions 136*a*, *c*, 138*a*, *c* of the passages 136, 138. This continues until the tail portions 118, 128 contact one another at the plane of contact 140. In this way, both the ground rod R and the ground wire W are securely clamped in place between the first and second portions 112, 122**, thereby establishing excellent electrical contact therebetween.

As shown in FIG. 8, relieved areas 146 are provided between the pivot shaft 124 and the pivot bearing 114 to reduce shearing forces on the ground rod R and the ground wire W, and to insure that these elements are bent rather than sheared when the connector 110 is closed.

FIG. 9 shows an exploded perspective view of a modified form of the connector 110 in which the ground rod receiving passage 136 is open at one side 144. This allows the connector of FIG. 9 to be installed on a ground rod R by moving the connector along the axis A until the ground rod R is positioned in the ground rod receiving passage 136. In this way, there is no need for access to the end of the ground rod R, and there is no requirement that the end of the ground rod R be of the same diameter as the body of the ground rod R.

Figure 10:
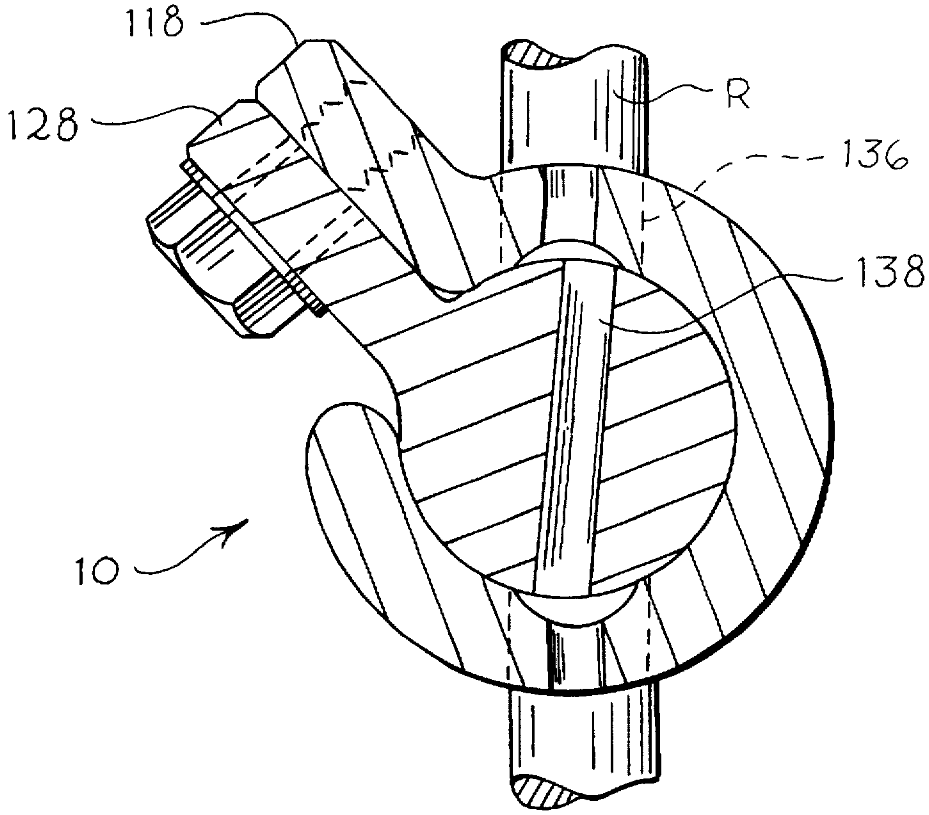
FIG. 10 is a cross sectional view of a variant of the embodiment of FIGS. 6–9.

In the embodiment shown in FIGS. 6 through 9, the ground rod R and the ground wire W extend generally perpendicularly to the tail portions 118, 128, and generally perpendicularly to the axis A. Alternately, the ground rod receiving passage 136 and the ground wire receiving passage 138 may be oriented obliquely with respect to the tail portions 118, 128, as shown in FIG. 10. This orientation places the tail portions 118, 128 more nearly in-line with the ground rod R. Installers of ground rods may sometimes force the ground rod R into the ground after the connector 110 has been attached to the rod R. This is possible where the ground is soft enough or where a hole has been previously formed in the ground. The connector orientation shown in FIG. 10 facilitates this approach by reducing the extent to which the tail portions extend radially away from the ground rod.

Of course, it should be understood that a wide range of changes and modifications can be made to the preferred embodiments described above. The connectors 10, 110 can be sized as appropriate for the ground rod R and ground wire W of the intended application. Proportions and details of construction can be modified extensively. The bolt 32, 132 can be lengthened and made to cooperate with an external nut (not shown). The connector 110 can be modified such that the second portion 122 is reversibly mounted in the first portion 112 to accommodate two sizes of rods and wires, as described for example in U.S. Pat. No. 4,479,694. It is therefore intended that the foregoing detailed description be taken as an illustration and not a definition of the present invention. It is the following claims, including all equivalents, which are intended to define the scope of this invention.

We claim:

1. A ground rod connector comprising:

first and second connector portions pivotably mounted together to move between an open position and a closed position;

each of said connector portions comprising a ground rod clamping portion and a tail portion;

said tail portions positioned adjacent one another in side-by-side orientation when the connector portions are in the closed position;

a fastener coupled between the tail portions to hold the connector portions in the closed position;

said connector portions cooperating to form a ground rod receiving passage and at least one ground wire receiving passage, said passages formed in part by the first connector portion and in part by the second connector portion, said passages oriented such that movement of the connector portions to the closed position is operative to clamp a ground rod in the ground rod receiving passage and a ground wire in the ground wire receiving passage, said passages each comprising a respective cross sectional area, the cross sectional area of said ground rod receiving passage being substantially greater than the cross sectional area of the ground wire receiving passage such that the connector portions are adapted to clamp said differently sized ground rod and ground wire simultaneously;

wherein the first and second connector portions form axially spaced portions of the ground rod receiving passage and the ground wire receiving passage;

wherein the ground rod receiving passage is oriented substantially transverse to a plane of contact between the tail portions when the tail portions are in the closed position.

2. A ground rod connector comprising:

first and second connector portions pivotably mounted together to move between an open position and a closed position;

each of said connector portions comprising a ground rod clamping portion and a tail portion;

said tail portions positioned adjacent one another in side-by-side orientation when the connector portions are in the closed position;

a fastener coupled between the tail portions to hold the connector portions in the closed position;

said connector portions cooperating to form a ground rod receiving passage and at least one ground wire receiving passage, said passages formed in part by the first connector portion and in part by the second connector portion, said passages oriented such that movement of the connector portions to the closed position is operative to clamp a ground rod in the ground rod receiving passage and a ground wire in the ground wire receiving passage, said passages each comprising a respective cross sectional area, the cross sectional area of said ground rod receiving passage being substantially greater than the cross sectional area of the ground wire receiving passage such that the connector portions are adapted to clamp said differently sized ground rod and ground wire simultaneously;

wherein the first and second connector portions form axially spaced portions of the ground rod receiving passage and the ground wire receiving passage;

wherein the ground rod receiving passage is oriented obliquely to a plane of contact between the tail portions when the tail portions are in the closed position.

3. A ground rod connector comprising:

first and second connector portions pivotably mounted together to move between an open position and a closed position;

each of said connector portions comprising a ground rod clamping portion and a tail portion;

said tail portions positioned adjacent one another in side-by-side orientation when the connector portions are in the closed position;

a fastener coupled between the tail portions to hold the connector portions in the closed position;

said connector portions cooperating to form a ground rod receiving passage and at least one ground wire receiving passage, said passages formed in part by the first connector portion and in part by the second connector portion, said passages oriented such that movement of the connector portions to the closed position is operative to clamp a ground rod in the ground rod receiving passage and a ground wire in the ground wire receiving passage, said passages each comprising a respective cross sectional area, the cross sectional area of said ground rod receiving passage being substantially greater than the cross sectional area of the ground wire receiving passage such that the connector portions are adapted to clamp said differently sized ground rod and ground wire simultaneously;

wherein the first and second connector portions form axially spaced portions of the ground rod receiving passage and the ground wire receiving passage;

wherein the ground rod receiving passage is open at one side of the first and second connector portions transverse to said axis defined by the ground rod receiving passage, such that the ground rod connector is adapted to receive the ground rod via said one side.

4. A ground rod connector comprising:

first and second connector portions pivotably mounted together to move between an open position and a closed position;

each of said connector portions comprising a ground rod clamping portion and a tail portion;

said tail portions positioned adjacent one another in side-by-side orientation when the connector portions are in the closed position;

a fastener coupled between the tail portions to hold the connector portions in the closed position;

said connector portions cooperating to form a ground rod receiving passage and at least one ground wire receiving passage, said passages formed in part by the first connector portion and in part by the second connector portion, said passages oriented such that movement of the connector portions to the closed position is operative to clamp a ground rod in the ground rod receiving passage and a ground wire in the ground wire receiving passage, said passages each comprising a respective cross sectional area, the cross sectional area of said ground rod receiving passage being substantially greater than the cross sectional area of the ground wire receiving passage such that the connector portions are adapted to clamp said differently sized ground rod and ground wire simultaneously.

wherein the ground wire receiving passage undulates between the first and second connector portions such that the connector portions are shaped to bend the ground wire as the connector portions are moved to the closed position.

5. The invention of claim 4 wherein the first and second connector portions form axially spaced portions of the ground rod receiving passage and the ground wire receiving passage.

6. The invention of claim 1 wherein the ground rod receiving passage is substantially parallel to the ground wire receiving passage.

7. The invention of claim 4 wherein the first connector portion comprises a pivot bearing, and wherein the second connector portion comprises a pivot shaft pivotably received in the pivot bearing.

8. The invention of claim 4 wherein the ground wire receiving passage comprises a serrated surface.

9. A ground rod connector comprising:

first and second connector portions, said first connector portion comprising a pivot bearing, said second connector portion comprising a pivot shaft pivotably received in the pivot bearing such that the connector portions are pivotably mounted together to move about a pivot axis between an open position and a closed position;

each of said connector portions comprising a ground rod clamping portion and a tail portion, said tail portions positioned adjacent one another in side-by-side orientation when the connector portions are in the closed position;

a fastener coupled between the tail portions to hold the connector portions in the closed position;

said pivot bearing and pivot shaft forming a ground rod receiving passage in said ground rod clamping portion, said ground rod receiving passage extending generally perpendicular to the pivot axis such that the pivot bearing forms first and second portions of the ground rod receiving passage and the pivot shaft forms a third portion of the ground rod receiving passage positioned between the first and second portions of the ground rod receiving passage;

said pivot bearing and pivot shaft forming a ground wire receiving passage in said ground rod clamping portion, said ground wire receiving passage extending generally perpendicular to the pivot axis such that the pivot bearing forms first and second portions of the ground wire receiving passage and the pivot shaft forms a third portion of the ground wire receiving passage positioned between the first and second portions of the ground wire receiving passage;

said passages oriented such that movement of the connector portions to the closed position is operative to clamp a ground rod in the ground rod receiving passage and a ground wire in the ground wire receiving passage, said passages each comprising a respective cross sectional area, the cross sectional area of said ground rod receiving passage being substantially greater than the cross sectional area of the ground wire receiving passage such that the connector portions are adapted to clamp the differently sized around rod and ground wire simultaneously.

10. The invention of claim 9 wherein the ground rod receiving passage is open at one side of the pivot shaft and the pivot bearing such that the ground rod connector is adapted to receive the ground rod via said one side along a direction parallel to said pivot axis.

11. The invention of claim 9 wherein the ground rod receiving passage comprises a serrated surface.

12. The invention of claim 9 wherein the ground rod receiving passage is oriented substantially transverse to a plane of contact between the tail portions when the tail portions are in the closed position.

13. The invention of claim 9 wherein the ground rod receiving passage is oriented obliquely to a plane of contact between the tail portions when the tail portions are in the closed position.

14. The invention of claim 9 therein the pivot bearing and the pivot shaft cooperate to form at least one relieved area between the pivot bearing and the pivot shaft to reduce shearing forces on the ground rod and the ground wire.

* * * * *

UNITED STATES PATENT AND TRADEMARK OFFICE

CERTIFICATE OF CORRECTION

PATENT NO. : 5,765,962
DATED : June 16, 1998
INVENTOR(S) : Paul A. Cornell et al.

It is certified that error appears in the above-identified patent and that said Letters Patent is hereby corrected as shown below:

In the Claims

In Claim 4, line 26, please change "." (period) to --;-- (semicolon).

In Claim 4, after line 26, please insert a new paragraph as follows:

--wherein the first and second connector portions form axially spaced portions of the ground rod receiving passage and the ground wire receiving passage;--.

Please cancel Claim 5.

In Claim 6, line 1, change "1" to --4--.

In Claim 9, line 44, change "around" to --ground--.

Signed and Sealed this

Eleventh Day of July, 2000

*Attest:*

Q. TODD DICKINSON

*Attesting Officer* — *Director of Patents and Trademarks*